(12) United States Patent
Bunch et al.

(10) Patent No.: US 12,515,016 B2
(45) Date of Patent: Jan. 6, 2026

(54) SECONDARY MANIPULATOR FOR A STEERING CATHETER

(71) Applicant: EPGEAR, LLC, Draper, UT (US)

(72) Inventors: Thomas Jared Bunch, Farmington, UT (US); Troy J. Orr, Draper, UT (US)

(73) Assignee: EPGear, LLC, Draper, UT (US)

( * ) Notice: Subject to any disclaimer, the term of this patent is extended or adjusted under 35 U.S.C. 154(b) by 603 days.

(21) Appl. No.: 16/803,840

(22) Filed: Feb. 27, 2020

(65) Prior Publication Data

US 2020/0276414 A1  Sep. 3, 2020

Related U.S. Application Data

(60) Provisional application No. 62/812,111, filed on Feb. 28, 2019.

(51) Int. Cl.
| | |
|---|---|
| *A61M 25/01* | (2006.01) |
| *A61L 29/04* | (2006.01) |
| *A61L 29/08* | (2006.01) |
| *A61M 25/09* | (2006.01) |
| *A61M 39/10* | (2006.01) |
| *A61M 39/28* | (2006.01) |

(52) U.S. Cl.
CPC ....... *A61M 25/0136* (2013.01); *A61L 29/042* (2013.01); *A61L 29/085* (2013.01); *A61M 25/0147* (2013.01); *A61M 39/1011* (2013.01); *A61M 39/284* (2013.01); *A61M 2025/09116* (2013.01)

(58) Field of Classification Search
CPC .......... A61M 25/0136; A61M 25/0147; A61M 39/1011; A61M 2025/09116; A61M 39/284; A61M 2025/0177; A61M 25/09041; A61M 2025/09125; A61M 25/0113; A61M 25/0662; A61M 2025/015; A61M 2025/0161; A61L 29/042; A61L 29/085; A61F 2002/30331; A61F 2/4455; A61F 2002/30011
See application file for complete search history.

(56) References Cited

U.S. PATENT DOCUMENTS

| | | |
|---|---|---|
| 4,417,710 A | 11/1983 | Adair |
| 5,010,899 A | 4/1991 | Thompson |
| (Continued) | | |

OTHER PUBLICATIONS

Bunch, et al., Office Action dated Jul. 9, 2020 for U.S. Appl. No. 15/913,708.

(Continued)

*Primary Examiner* — James D Ponton
(74) *Attorney, Agent, or Firm* — Laurence & Phillips IP Law

(57) ABSTRACT

A secondary manipulator device for positioning a distal portion of an elongated medical instrument inside a patient is disclosed. The secondary manipulator device includes a retaining member having a channel configured to receive therein an intermediate portion of the elongated medical instrument. The retaining member can include a lock comprising a seat against which the elongated medical instrument can rest and a resiliently deformable retention arm that is movable relative to the seat. The lock, when in the securing state, can retain the intermediate portion within the channel to allow translating and/or rotating of the distal portion.

17 Claims, 11 Drawing Sheets

(56) References Cited

U.S. PATENT DOCUMENTS

| | | | |
|---|---|---|---|
| 5,423,769 | A | 6/1995 | Jonkman et al. |
| 5,429,615 | A | 7/1995 | Starchevich |
| 6,113,062 | A | 9/2000 | Schnell et al. |
| 6,314,959 | B1 | 11/2001 | Griesbach et al. |
| 6,629,615 | B2 | 10/2003 | Kim |
| 7,234,677 | B2 | 6/2007 | Zerfas |
| 7,770,583 | B2 | 8/2010 | Harris et al. |
| 8,342,459 | B2 | 1/2013 | Garrison et al. |
| 8,523,824 | B2 | 9/2013 | Teirstein et al. |
| 2002/0082584 | A1* | 6/2002 | Rosenman ........ A61M 25/0068 604/523 |
| 2002/0165484 | A1* | 11/2002 | Bowe ................ A61M 25/0136 604/95.05 |
| 2004/0143238 | A1* | 7/2004 | Lee ................... A61M 25/0084 604/82 |
| 2009/0223041 | A1 | 9/2009 | Garrison et al. |
| 2010/0249510 | A1 | 9/2010 | Yamada |
| 2015/0157829 | A1* | 6/2015 | Bunch .................. A61M 25/02 604/174 |
| 2015/0174372 | A1* | 6/2015 | Kaiser .................... A61F 2/004 604/174 |
| 2017/0238829 | A1* | 8/2017 | Parker .................. A61B 5/6852 |
| 2017/0239444 | A1* | 8/2017 | Parker .................. A61B 5/6852 |
| 2018/0256852 | A1 | 9/2018 | Bunch et al. |

OTHER PUBLICATIONS

"Progressive Dynamics Medical, Cord Companion Instructions for Use", publication date unknown, available at http://www.progressivedynamicsmedical.com/pdf/cc_duo_usage_instructions.pdf, last visited Apr. 15, 2016 (2 pages).

"Vascular Disease Management, Vascular Solutions launches the Angio Assist Docking Station and the Teirstein Edge Device Organizer", Nov. 8, 2010, available at http://www.vasculardiseasemanagement.com/content/vascular-solutions-launches-angio-assist%E2%84%A2-docking-station-and-teirstein-edge%E2%84%A2-device-organiz, last visited Apr. 15, 2016 (4 pages).

"Vascular Solutions, Teirstein Edge Device Oranizer Instructions For Use", Feb. 2013 (1 page).

"Vascular Solutions, Teirstein Edge Device Organizer Instructions For Use", Dec. 2015 (1 page).

Bunch, et al., Notice of Allowance dated Nov. 21, 2017 for U.S. Appl. No. 14/565,326.

Bunch, et al., Office Action dated Apr. 6, 2017 for U.S. Appl. No. 14/565,326.

Bunch, et al., Office Action dated Jan. 9, 2020 for U.S. Appl. No. 15/913,708.

\* cited by examiner

SECONDARY MANIPULATOR FOR A STEERING CATHETER

RELATED APPLICATIONS

This application claims priority to U.S. Provisional Application No. 62/812,111, filed on Feb. 28, 2019, and titled SECONDARY MANIPULATOR FOR A STEERING CATHETER, which is incorporated herein by reference in its entirety.

TECHNICAL FIELD

The present disclosure relates generally to devices used to manipulate elongated medical instruments. More specifically, the present disclosure relates to manipulator devices used to axially translate and/or rotate a distal portion of an elongated body of an elongated medical instrument, such as a steerable vascular catheter.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
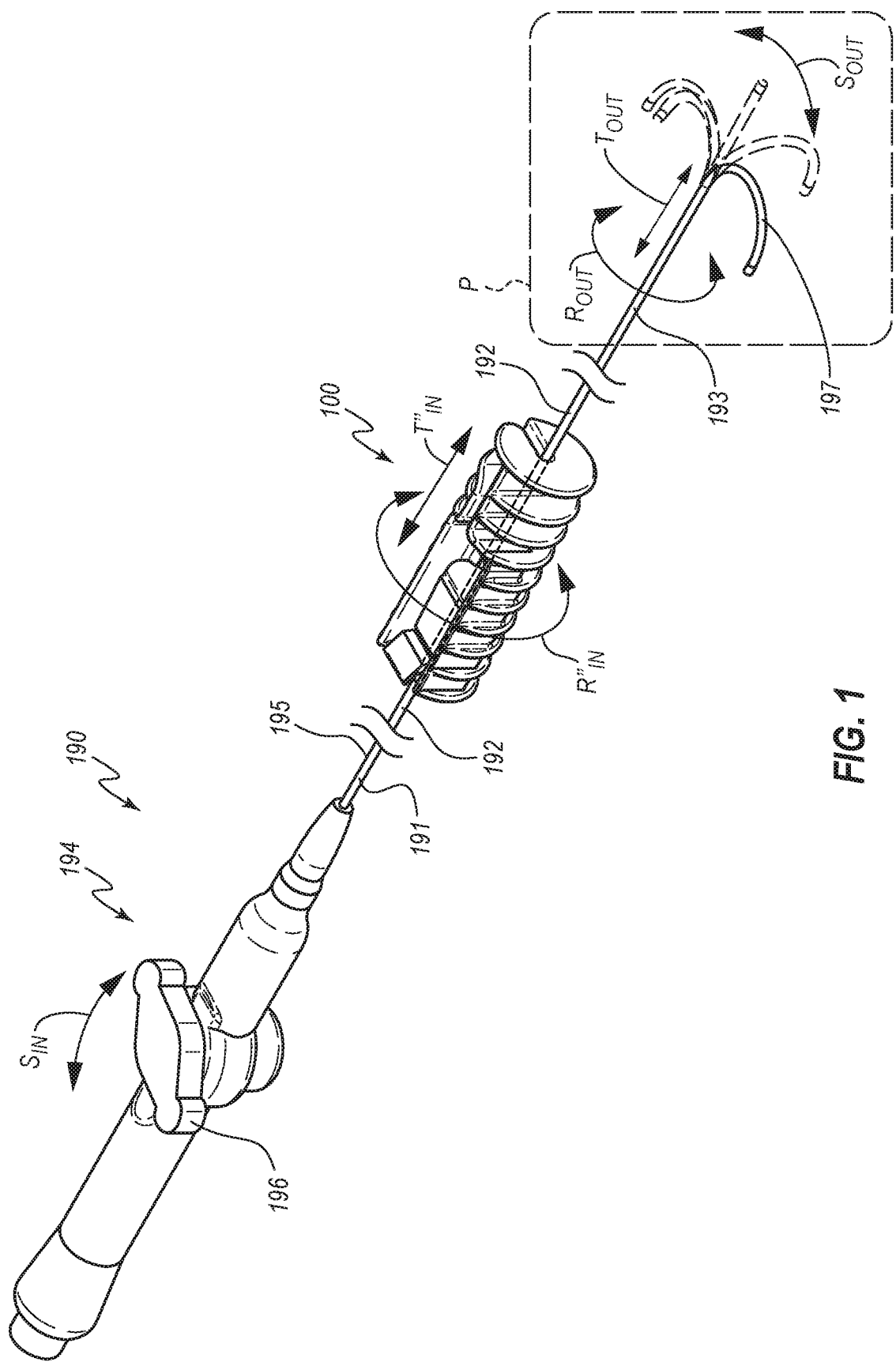
FIG. 1 is a perspective view of an embodiment of a secondary manipulator device coupled to an elongated medical instrument.

Various medical procedures involve the use of one or more elongated instruments. As used herein the term "elongated instrument" is directed to devices such as catheters (e.g., ablation catheters, electrogram catheters, diagnostic catheters, sensing catheters, temporary pacemaking catheters), steering sheaths, cannulae, guidewires, sensor wires, electrical cables, tubes, support lines, etc. Such elongated instruments can include a distal end and a proximal end. In some arrangements, the distal end of an elongated medical instrument, such as a catheter, can be introduced into the patient in any suitable manner, such as, for example, via a sheath introducer and accompanying techniques. The elongated instrument may, for example, be said to enter the patient at an insertion site. The distal end of the elongated instrument may be advanced to a desired position within the patient. In some instances, a proximal portion and/or an intermediate portion of the elongated instrument may be rotated or otherwise manipulated while the distal end is advanced to the desired position. Such rotation and/or other manipulation may give rise to a torque about the longitudinal axis of the elongated instrument. Such torque can cause the distal end of the elongated instrument to move, turn, bend, or otherwise change directions.

In some instances, control over the location of the distal end of the elongated instrument can be difficult. For example, manipulating the proximal end of the elongated instrument may not adequately control the distal end. For instance, the intermediate portion of the elongated instrument may respond to movement of the proximal end rather than the distal end. Slack or regions of the intermediate portion of the elongated instrument outside the patient's body can thus increase the difficulty of various medical procedures, such as cardiac ablation and mapping procedures. The secondary manipulator devices disclosed herein can aid in overcoming these problems by enabling a practitioner to control the elongated instrument at various locations along the elongated instrument. The secondary manipulator devices disclosed herein can also be used to maintain the torque at the proximal or intermediate region to maintain the distal end in a desired orientation within the patient.

As an example, in various instances, one or more catheters may be inserted into a patient in electrophysiology or cardiology procedures. In certain of such procedures, one or more of an electrogram-detecting catheter, a mapping catheter, a diagnostic catheter, an ablation catheter, a steering catheter or a steering sheath may be introduced into a patient. In some instances, a practitioner may advance the distal end of a catheter or sheath to a desired position within the patient by manipulating (e.g., via a hand or a primary manipulation device) more proximal regions of the catheter at an exterior of the patient. A secondary manipulation device disclosed herein can be further employed at an intermediate portion of the catheter or sheath to aid in advancing the distal end of such catheter or sheath. The secondary manipulation device can further be used to control the movement and/or location of the distal end. This can be especially helpful when conducting a cardiac mapping and/or ablation procedure where precise control is advantageous. These and other embodiments are further discussed below.

Embodiments may be understood by reference to the drawings, wherein like parts are designated by like numerals throughout. It will be readily understood by one of ordinary skill in the art having the benefit of this disclosure that the components of the embodiments, as generally described and illustrated in the figures herein, could be arranged and designed in a wide variety of different configurations. Thus, the following more detailed description of various embodiments, as represented in the figures, is not intended to limit the scope of the disclosure, but is merely representative of various embodiments. While the various aspects of the embodiments are presented in drawings, the drawings are not necessarily drawn to scale unless specifically indicated.

It will be appreciated that various features are sometimes grouped together in a single embodiment, figure, or description thereof for the purpose of streamlining the disclosure. Many of these features may be used alone and/or in combination with one another.

The phrases "coupled to" and "in communication with" refer to any form of interaction between two or more entities, including mechanical, electrical, magnetic, electromagnetic, fluid, and thermal interaction. Two components may be coupled to or in communication with each other even though they are not in direct contact with each other. For example, two components may be coupled to or in communication with each other through an intermediate component.

Unless otherwise defined, the directional terms "distal" and "proximal" are given their ordinary meaning in the art. That is, the distal end of a medical device means the end of the device furthest from the practitioner or closest to the patient's body during use. The proximal end refers to the opposite end, or the end nearest the practitioner or furthest from the patient's body during use.

FIGS. 1-11 illustrate different views of several secondary manipulator devices and related components. In certain views each device may be coupled to, or shown with, additional components not included in every view. Further, in some views only selected components are illustrated, to provide detail into the relationship of the components. Some components may be shown in multiple views, but not discussed in connection with every view. Disclosure provided in connection with any figure is relevant and applicable to disclosure provided in connection with any other figure or embodiment.

FIGS. 1-7 depict an embodiment of a secondary manipulator device 100 and related methods of use. As detailed below, the secondary manipulator device 100 comprises a retention member 102 and a handle 170. In FIG. 1, the secondary manipulator device 100 is shown coupled to an elongated medical instrument 190. The illustrated elongated medical instrument 190 is a steerable vascular catheter. In other embodiments, the elongated medical instrument 190 may be another suitable device, such as other types of catheters (e.g., ablation catheters, electrogram catheters, diagnostic catheters, sensing catheters, temporary pacemaking catheters), steering sheaths, cannulae, guidewires, sensor wires, etc. An elongated body 195 of the elongated medical instrument 190 includes a proximal portion 191, an intermediate portion 192, and a distal portion 193.

As shown in FIG. 1, in the illustrated embodiment, the elongated medical instrument 190 (e.g., steering catheter) comprises both a primary manipulator device 194 and a secondary manipulator device 100. The primary manipulator device 194 is coupled to a proximal portion 191 of the elongated body 195 and is configured to control the shape of the distal portion 193 of the elongated body 195. For example, the primary manipulator device 194 may include an actuator 196 that can be actuated (e.g., rotated), shown as $S_{IN}$, to deform the shape of the distal end 197, shown as $S_{OUT}$. In certain embodiments, the actuator 196 can be actuated to bend or otherwise turn the distal end 197 of the elongated body 195.

As further shown in FIG. 1, the secondary manipulator device 100 can be selectively coupled to an intermediate portion 192 of the elongated body 195. In other words, the secondary manipulator device 100 can be selectively coupled to the elongated body 195 at a location that is between the distal portion 193, which may be disposed within the patient's body, and the proximal portion 191, which may comprise a primary manipulator device 194. The location of the secondary manipulator device 100 along the elongated body 195 can also be adjusted by the practitioner to achieve a desired location. At the user's discretion, the secondary manipulator 100 can be manipulated to further control the distal portion 193 of the elongated body 195. For instance, the secondary manipulator 100 can be manipulated to control a rotation and/or axial translation of the distal end 197, which may be disposed inside a patient.

With reference to FIG. 1, the secondary manipulator device 100 can be axially translated, shown as $T''_{IN}$, relative to the primary manipulator device 194. For instance, the secondary manipulator device 100 can be axially translated relative to the primary manipulator device 194 within an extent of slack of the elongated body 195 between the primary manipulator device 194 and the secondary manipulator device 100. When coupled to the elongated body 195, axial translation of the secondary manipulator device 100 ($T''_{IN}$) can result in axial translation of the distal portion 193 of the elongated body 195, shown as $T_{OUT}$. The secondary manipulator 100 can also be rotated, shown as $R''_{IN}$, about a longitudinal axis of the elongated body 195. When coupled to the elongated body 195, rotation of the secondary manipulator device 100 ($R''_{IN}$) can result in rotation of the distal portion 193 of the elongated body 195, shown as $R_{OUT}$.

In some embodiments, the secondary manipulator 100 can be rotated about a longitudinal axis of the elongated body 195 relative to the primary manipulator device 194 within the extent of the torsional strain limits of the material of the elongated body 195 between the rotationally constrained primary manipulator device 194 and the torqued secondary manipulator device 100. In certain embodiments, the secondary manipulator device 100 can be rotated at least 180 degrees, 360 degrees, or even several rotations relative the primary manipulator device 194 without adversely affecting the elongated body 195. For instance, the diameter of the elongated body 195 can be relatively small and/or the elongated body 195 can comprise plastic and/or other elastomeric materials such that the secondary manipulator device 100 can be rotated without adversely affecting the elongated body 195.

Figure 2:
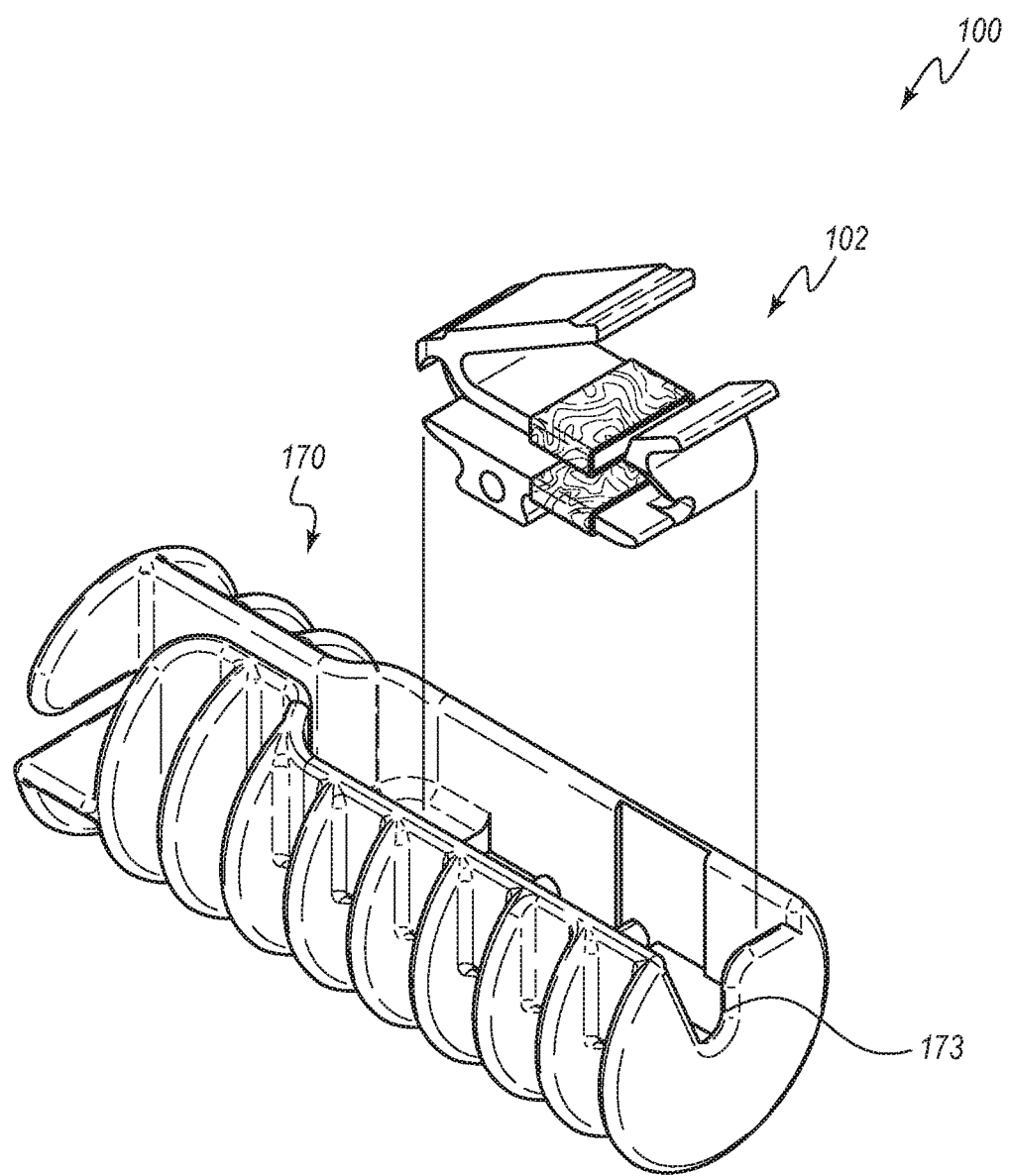
FIG. 2 is an exploded perspective view of the secondary manipulator device of FIG. 1.

FIG. 2 is an exploded perspective view of the secondary manipulator device 100 of FIG. 1. In the depicted embodiment, the secondary manipulator device 100 includes a retention member 102 and a handle 170. The retention member 102 can generally correspond with a portion of the secondary manipulator device 100 that is configured to retain at least a portion of the elongated medical instrument to facilitate manipulation of a distal portion of the elongated medical instrument (see e.g., FIG. 1). The handle 170 can aid in the introduction of the intermediate portion of the elongated medical instrument into the retention member 102 and can provide a hand grip for manipulation of the secondary manipulator device 100 by a user. For example, as discussed below, in some instances the handle 170 can provide a desired insertion path 173 along which the elongated medical instrument can be introduced into the retention member 102. For instance, the intermediate portion 192 of the elongated body 195 can be inserted into the secondary manipulator device 100 without passing an end (e.g., distal end or proximal end) of the elongated body through the insertion path 173. In other or further embodiments, the handle 170 can include one or more features that assist in maintaining the elongated medical instrument within the retention member 102. Moreover, in some embodiments, an insertion path 173 defined by the handle 170 may also serve as an exit path along which the elongated instrument may be removed from the secondary manipulator device 100.

In the illustrated embodiment, the retention member 102 and the handle 170 are each formed by distinct pieces. Such distinct pieces can be temporarily fixed, or permanently coupled together in any suitable manner. In other embodiments, a unitary piece of material may define at least a portion of each of the retention member 102 and the handle 170. For example, in some embodiments, the entire secondary manipulator device 100 may be molded as a monolithic, unitary piece of material. In other embodiments, one or more of the retention member 102 and the handle 170 can be molded and subsequently coupled together.

Figure 3:
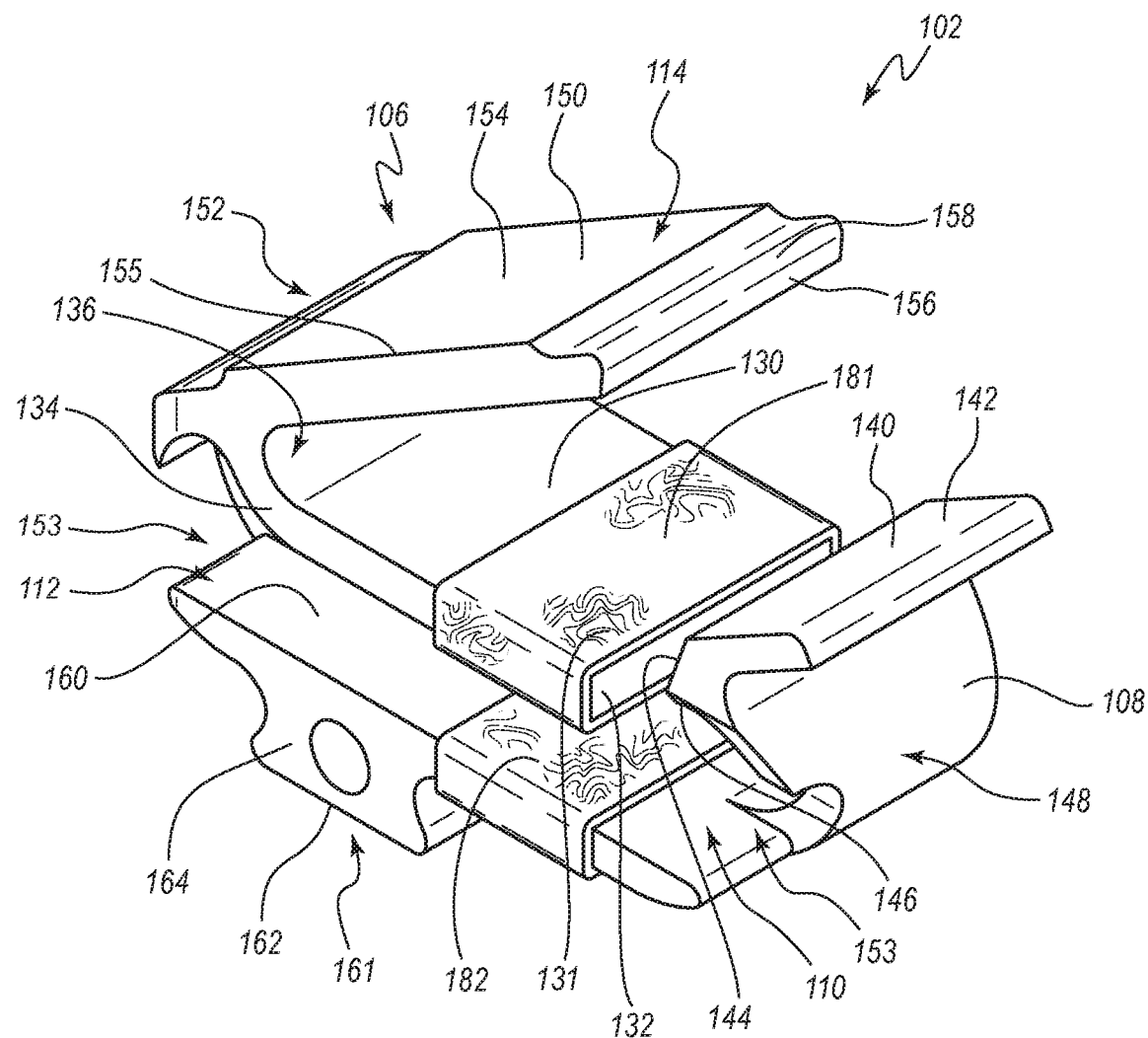
FIG. 3 is a perspective view of a retention member of the secondary manipulator device of FIG. 1.

In the illustrated embodiment shown in FIG. 3, the retention member 102 includes a channel 110 (which may also be referred to as a retention channel), an opening 112 (which may also be referred to as an insertion opening and/or as an exit opening), and a lock 114. An elongated medical instrument (see FIG. 1) can be introduced into the retention member 102 and/or removed from the retention member 102 via the opening 112. When used with the handle 170, the opening 112 can be positioned between the retention member 102 and a wall of the handle 170. Accordingly, in the illustrated embodiment, the retention member 102 and the handle 170 can cooperate to define the opening 112 (See FIGS. 6A-6C).

The channel 110 can be configured to receive an elongated medical instrument therein. In some embodiments, the channel 110 may be sized to receive elongated medical instruments that have a variety of different diameters or that have a variety of different maximum cross-sectional areas (e.g., where each cross-sectional area is taken along a plane that is perpendicular to a longitudinal axis of the elongated instrument).

The lock 114 can be configured to transition between an open state and a securing state, which may also be referred to as a closed state. The lock 114 can be used to selectively retain the elongated medical instrument in the channel 110 when in the securing state. In the illustrated embodiment, the lock 114 includes a retention arm 130, which may also be referred to as a spring, or spring member, and further includes a seat 160. The retention arm 130 and the seat 160 are configured to interact with each other to retain the elongated medical instrument within the channel 110. In the illustrated embodiment, at least a portion of each of the retention arm 130 and the seat 160 define portions of the channel 110. Stated otherwise, at least a portion of the channel 110 may extend between the retention arm 130 and the seat 160. Other limits, contours, or boundaries of the illustrated channel 110 are further detailed below.

As further discussed below, the lock 114 can further include a latch 140 that is configured to selectively interact with a locking arm 150, which may also be referred to as a locking member, to transition the lock 114 between the open and the securing states. In particular, the latch 140 may selectively retain an end of the locking arm 150, which can permit the retention arm 130 to press against the elongated instrument within the channel 110. Releasing the latch 140 can permit the locking arm 150 and the retention arm 130 to return to a natural state in which the elongated medical instrument is no longer restrained by the holding device 100, as discussed further below.

Figure 4A:
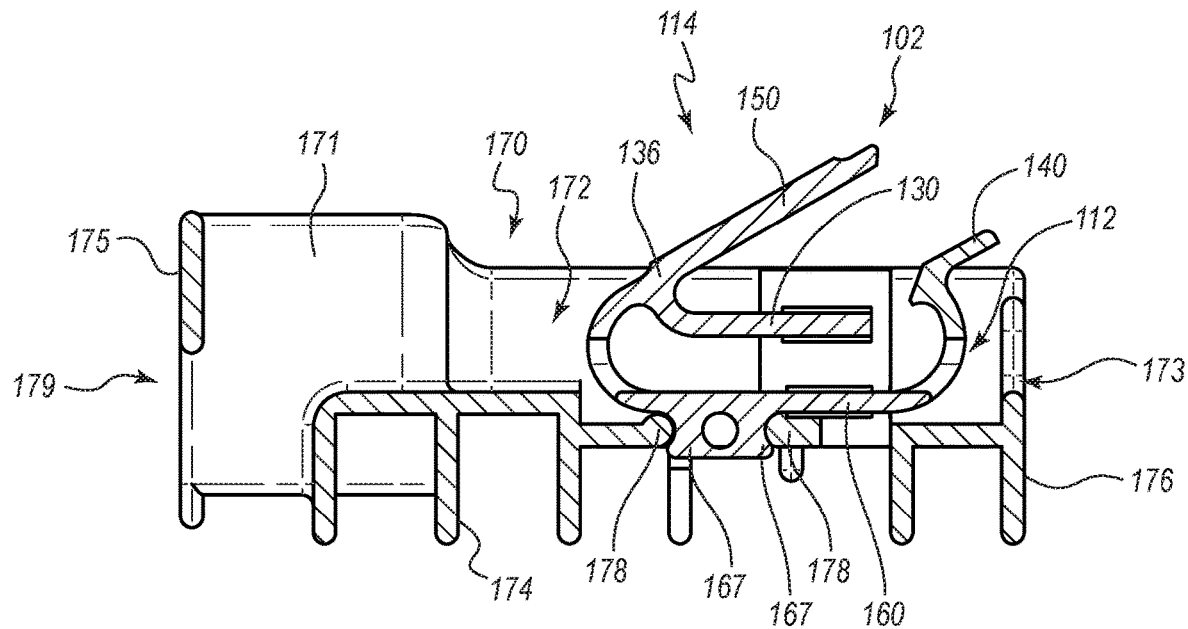
FIG. 4A is a cross-sectional view of the secondary manipulator device of FIG. 1 with the retention member in an open state.
Figure 4B:
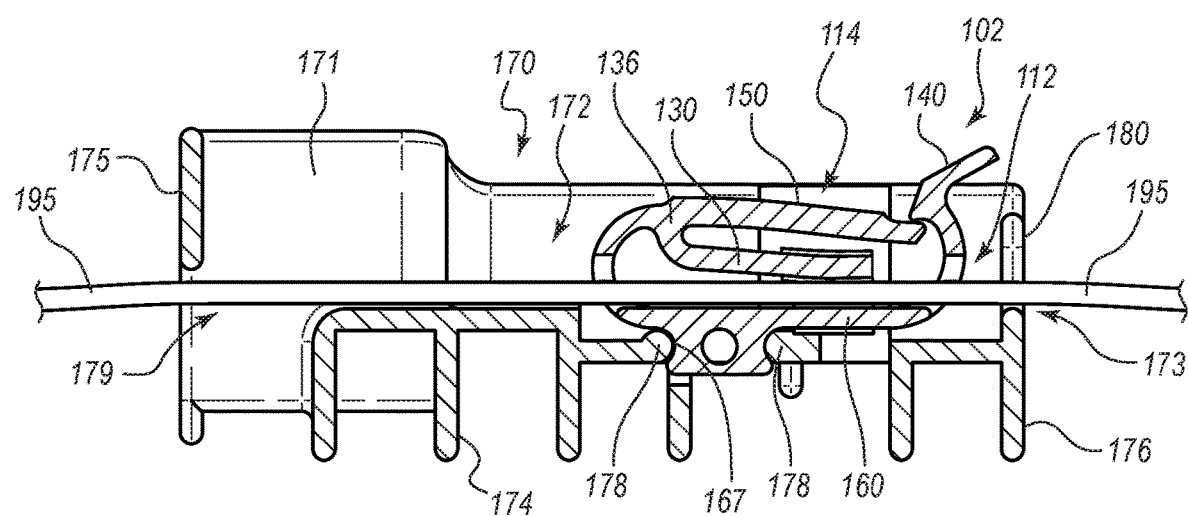
FIG. 4B is a cross-sectional view of the secondary manipulator device of FIG. 1 with the retention member in a securing state.

As illustrated in FIGS. 4A and 4B, the retention arm 130 can move toward the seat 160 as the lock 114 is transitioned from the open state (shown in FIG. 4A) to the securing state (shown in FIG. 4B) and can move away from the seat 160 as the lock 114 is transitioned from the securing state to the open state. The retention arm 130 is coupled to the locking arm 150. Movement of the locking arm 150 can affect movement of the retention arm 130. The retention arm 130 may be connected to the locking arm 150 at a hinge 136, which may also be referred to as an elbow, joint, transition region, or pivot.

With continued reference to FIG. 3, in the illustrated embodiment, the retention arm 130 comprises an elongated body 131 that extends between opposing ends 132, 134. The end 132 may be referred to as a distal end, and the end 134 may be referred to as a proximal end, with the distal and proximal terms being based on proximity to the hinge 136. In some embodiments, the body 131 comprises a flexible material. In further embodiments, the body 131 may be resiliently flexible so as to be able to repeatedly transition from a resting or natural state to a displaced or deformed state, and further, return to the natural state. In still further embodiments, the hinge 136 may be flexible. In the illustrated embodiment, the body 131 is substantially planar when in the natural state and is deflected to a bent orientation when in a displaced or deformed state. In other embodiments, the body 131 may be curved or bent when in the natural state. In the illustrated embodiment, the hinge 136 and the body 131 are integrally formed of a unitary monolithic piece of material.

In the illustrated embodiment, the retention arm 130 and/or the elongated body 131 is also substantially flexible such that the elongated body 131 can substantially conform to the shape of an elongated instrument disposed within the channel 110 of the retention member 102. For instance, the retention arm 130 may conform along a point or line of contact between the retention arm 130 and the elongated instrument. The contact may be with or without a gripper 181, and the shape of the portion of the elongated body 131 may substantially conform to the shape of the elongated instrument (or surface thereof). For instance, a portion of the elongated body 131 can bend to form a continuous point or line of contact along an upper surface of the elongated instrument. The line of contact can be disposed on and extend along a longitudinal length of the elongated instrument. In other words, the line of contact can be disposed along a surface of the elongated instrument that is substantially parallel with a longitudinal axis of a lumen extending through the elongated instrument.

The retention arm 130 is also resiliently flexible such that the shape of the elongated body 131 or engaged portion of the arm 130 in contact with the elongated instrument (or the seat 160 if no elongated instrument is disposed within the channel 110) will substantially return to the open state when the lock 114 is released, and then reform to take the shape of an elongated instrument (or the seat 160) when in the securing state. In certain embodiments, the retention arm 130 is further configured to apply pressure to (e.g., squeeze) the elongated instrument within the channel 110 when in the securing state. The combination of the contact surface area between the retention member and the elongated instrument, the force applied between the retention arm 130 and the seat 160 onto the engaging surfaces of the elongated instrument (e.g., upper and lower engaging surfaces), and the friction between the engaging surfaces exceeds the forces induced on the elongated instrument when the instrument is manipulated both in rotational and translational movements. The holding force can maintain the relative position of the elongated instrument without substantially deforming the cross-sectional shape of the elongated instrument. In some embodiments, the engagement surface area exceeds the cross-sectional area of the elongated instrument. In other embodiments, it may be at least about 5 times, about 10 times, or about 100 times greater than the cross-sectional area. In some embodiments, a longitudinal line of contact between the retention arm 130 and the elongated instrument establishes the engagement. The length of engagement can be longer than the perimeter of the transverse cross-section perimeter of the elongated instrument. In some embodiments, it is at least about 2 times, about 5 times or about 10 times greater than the length of the perimeter. Without limitation, the application of pressure by the retention arm 130 can be similar to pinching something between a thumb and side of a forefinger. This application of pressure can also create enough force or friction along the engaged surface of the elongated instrument to overcome forces that cause the elongated instrument to want to move, rotate, or slide within the channel 110. Thus, this application of pressure can substantially retain or otherwise fix the position of the elongated instrument relative to the retention member 102. Further, the application of pressure can be distributed along the engaged surface of the elongated instrument such that the position of the elongated instrument can be retained without collapsing or otherwise closing a lumen of the elongated instrument (e.g., without forcing two opposing sides of the elongated instrument together).

In other embodiments, the body 131 of the retention arm 130 may be relatively stiff or inflexible. In such embodiments, the retention arm 130 may be configured to flex only at the hinge 136. The distal end 132 of the body 131 may be able to grip the elongated medical instrument 195 as the retention arm 130 is urged toward the seat 160 and as potential energy is stored in the hinge 136 as the lock 114 is transitioned to the securing state. The hinge 136 may be resiliently flexible to return the body 131 to a natural or resting state when the lock 114 is returned to the open state.

The retention arm 130 may be moved via the locking arm 150. For example, in some instances, it may be said that the retention arm 130 is moved indirectly via the locking arm 150, as the locking arm 150 is directly contacted (e.g., via a finger of a practitioner) to effect movement of the retention arm 130. Stated otherwise, the locking arm 150 may be used to actuate the retention arm 130, or to cause the retention arm 130 to interact with the seat 160 or with an elongated medical instrument that is positioned between the retention arm 130 and the seat 160. The locking arm 150 may include a grip 154 for this purpose. In the illustrated embodiment, the grip 154 is a region of increased thickness 155, which can reinforce the locking arm 150. The grip 154 can include a region of increased friction 155 of any suitable variety, in some embodiments, such as a series of ridges and/or bumps, a different material having an increased coefficient of friction (e.g., an elastomeric material such as rubber), and/or any other suitable gripping feature. In some embodiments, the grip 154 may be used as a locating feature, which may provide visual and/or tactile information regarding a position at which the locking arm 150 can be touched to cause the arm to actuate to the securing state. The outer contours of the region of increased friction 155 is depicted as a substantially square region in FIG. 3.

The locking arm 150 can be connected to the seat 160 via a hinge 152. In the illustrated embodiment, the hinge 152 defines a larger radius of curvature than does the hinge 136. In various embodiments, the hinge 152 may have a different flexibility than does the hinge 136. In other embodiments, the hinges 136, 152 have substantially the same flexibility. In certain embodiments, the locking arm 150 may be configured to function as a resilient spring in manners that are the same or similar to the retention arm 130. For example, in the illustrated embodiment, the locking arm 150 can be relatively stiff or inflexible, and this substantial rigidity may be reinforced by the grip 154, which, as previously discussed, may include a region of increased thickness. The locking arm 150 may nevertheless pivot via the hinge 152, which can store potential energy as the lock 114 is transitioned from the open state to the securing state. The hinge 152 may be resiliently flexible to permit repeated transitions between the open and securing states.

When the latch 140 releases the distal end of the locking arm 150, the potential energy stored in the hinge 152 can automatically transition the locking arm 150 to its natural state. The potential energy stored in the hinge 136 may likewise assist in returning the locking arm 150 to its natural state, at least during a period in which the retention arm 130 interacts directly or indirectly (e.g., via the elongated medical instrument 190) with the seat 160.

In the illustrated embodiment, a notch 153 is provided in the hinge 152. The notch 153 defines a first end of the channel 110 through which the elongated medical instrument can pass. The first end of the channel 110 can correspond with a first end 106 of the retaining member 102. The device can further define a second end 108 that is opposite from the first end 106. The terms "first" and "second" do not necessarily denote a preferred orientation of the retaining member 102. For example, in some instances, the first end 106 may be directed toward an insertion site at which the elongated medical instrument enters the patient, whereas in other instances, the second end 108 may be directed toward the insertion site.

A distal end of the locking arm 150 (as determined based on proximity to the hinge 152) can include an angled face 156 that is configured to assist in transitioning the lock 114 to the securing state, as discussed further below. The distal end may include another angled face 158 that is configured to assist in maintaining the lock 114 in the securing state, as discussed further below.

With continued reference to FIG. 3, the latch 140 can include a grip 142, which may resemble the grip 154 discussed above. For example, the grip 142 may be manipulated in a direction away from the first end 106 of the retention member 102 to release the locking arm 150 and thus transition the lock 114 from the securing orientation to the open orientation. In the illustrated embodiment, the grip 142 is positioned on a protrusion that extends generally upwardly at the second end 108 of the retention member 102.

The latch 140 can include an angled face 144 that is configured to interact with the angled face 156 of the locking arm 150 as the holding device 100 is transitioned from the open state to the closed state. In particular, the faces 144, 156 may be configured to slide past one another in a manner that causes the latch 140 to be urged outwardly toward the second end 108 of the holding device 100 as the locking arm 150 is pressed downwardly toward the seat 160.

The latch 140 can further include a retaining face 146 that is configured to interact with the face 158 of the locking arm 150 to maintain the holding device 100 in the closed state. In particular, after the locking arm 150 has been compressed downwardly toward the seat 160 by a sufficient amount, the latch 140 is deflected away by the interference between surface 156 and surface 144 as the locking arm rotates about hinge 152 and the latching arm rotates about hinge 148 and can spring back to a natural position. In this position, the face 146 may be above the face 158. When the compressive force is no longer applied to the locking arm 150, the locking arm 150 may be permitted to begin a resilient return to its natural state. However, the retaining face 146 can engage the face 158 of the locking arm 150 to prevent the arm from fully returning to its natural position, thus maintaining the holding device 100 in the closed state.

Locks 114 other than that described above with respect to the latch 140 and the locking arm 150 are also possible. For example, the locking arm 150 and the retention arm 130 may be retained in a compressed state via a separate clamp (not shown), such as a ratcheting vice grip, that provides compressive forces to a bottom of the seat 160 and a top of the locking arm 150 at the first end 106 of the holding device 100. Any other suitable locking arrangement is also contemplated. The illustrated embodiment of the lock 114 can be advantageous in some instances, as the lock 114 may be manipulated into the securing state and/or may be manipulated into the open state by a practitioner with the use of a single hand.

In some embodiments, the lock 114 may be moved to each of the securing state and the open state by urging separate components thereof generally in the same direction. For example, as shown in FIGS. 4A and 4B, and discussed further below, generally downward forces may be applied separately to the locking arm 150 and the latch 140 to separately transition the lock 114 to the securing state and the open state, respectively. Such an arrangement can be advantageous, in some instances, as the retention member 102 can be disposed within a handle. Thus, in some instances, the retention member 102 may be manipulated via a single finger while it is disposed within a handle. In other instances, the handle and retention member 102 may be held within a practitioner's hand, such as within a closed fist, and the curled fingers of a hand may provide the reactive surface while the thumb, or a single finger, may be used to manipulate either the locking arm 150 or the latch 140 to effect closing or opening of the lock 114, respectively.

In the illustrated embodiment, a notch 153 is also provided in the hinge 148 of the latch 140. The notch 153 defines a second end of the channel 110 through which the elongated instrument can pass. The second end of the channel 110 can correspond with the second end 108 of the holding device 100.

In the illustrated embodiment, the seat 160 extends longitudinally between the hinges 152, 148. The seat 160 can be arranged as a platform against which the elongated medical instrument can rest. In some embodiments, the seat 160 defines a substantially planar surface. A base 161 of the retention member 102 can include the seat 160. In the illustrated embodiment, the base 161 further includes a support 162 that extends outwardly from a neck 164 toward each of the first and second ends 106, 108 of the retaining member 102. In the illustrated embodiment, the neck 164 is oriented between the seat 160 and the support 162. Portions of the seat 160 that are not constrained by the support 162 can contribute to the flexibility of the hinges 152 and 148 to allow the hinges to deflect elastically as the holding device 100 is changed between the holding state and the open state. The support 162 can stabilize the retaining member 102 during use thereof. The support 162 can also be used to couple the retaining member 102 to a handle 170 or other device. In some instances, material costs may be reduced by providing spaces between the seat 160 and the support 162. The neck 164 can permit such spacing.

In some embodiments, the retention arm 130 and/or the seat 160 can include one or more gripping surfaces 181, 182 to increase frictional engagement with an elongated medical instrument. In various embodiments, the one or more gripping surfaces can include one or more of ridges; grooves; coatings; high-frictional material inserts, attachments, overmoldings, etc. (e.g., rubber); and/or any other suitable feature.

Figure 5:
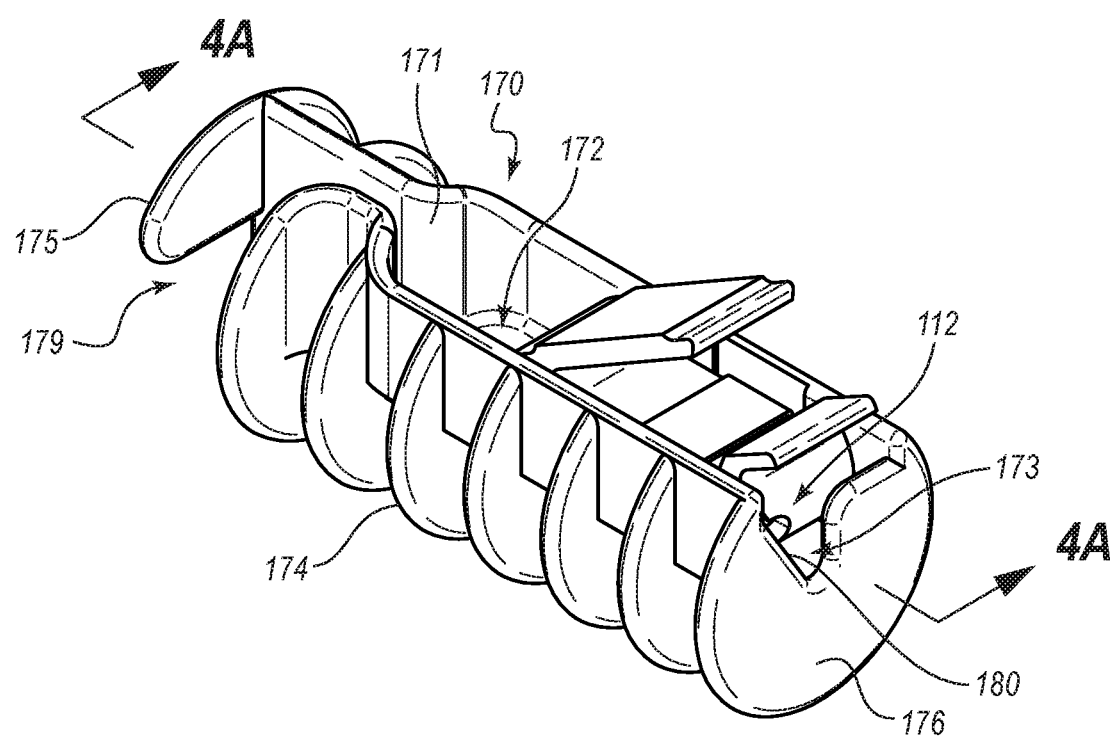
FIG. 5 is a perspective view of the secondary manipulator device of FIG. 1 with the retention member in an open state.

FIGS. 4A-6C illustrate an embodiment of the retention member 102 coupled to a handle 170. The handle 170 is shown to include a body 171. The body 171 is shown to include a cavity or channel 172, an insertion path 173, and a gripping feature 174. The body 171 is shown to have a generally cylindrical shape with a diameter that is suitable to be grasped by the user's hand. For example, the diameter of the body 171 may be at least twice a diameter of the elongated body 195 in some embodiments. In other embodiments, the diameter may be 3, 5, 10, or 20 times the diameter the elongated body 195. In some embodiments, the body 171 may have any other suitable shape, such as square, elliptical, or other geometries are likewise within the scope of this disclosure. The gripping feature 174 may be disposed on an outer surface of the body 171. As depicted in FIG. 5, the gripping feature 174 includes a plurality of transversely oriented discs or ribs disposed at various locations along a length of the body 171. In other embodiments, the gripping feature 174 can include one or more of ridges; grooves; bumps, recesses, high-frictional coatings; high-frictional material inserts, attachments, overmoldings, of rubber, silicone, thermoplastic elastomer; and/or any other suitable feature.

The handle 170 can also be configured such that the elongated device is disposed substantially within a central longitudinal axis of the handle 170. The length of the handle 170 can vary. In some embodiments, the handle 170 is sized such that it extends from at least a first finger, across a second finger, and to at least a third finger. As the handle 170 is twisted or otherwise moved when in the securing state, the elongated device can also be configured to rotate about an axis that is substantially the same as the longitudinal axis of the elongated device.

The cavity 172 is disposed within the body 171. A proximal portion may be narrow and sized to receive the elongated body 195 while a distal portion may be wider and sized to receive the retention member 102. The retention member 102 may be coupled to the body 171 using any suitable technique. For example, as illustrated in FIGS. 4A-4B, the body 171 includes protrusions 178 and the retention member 102 includes recesses 167 configured to receive the protrusions 178 to couple the retention member 102 to the handle 170 within the cavity 172. The coupling of the protrusions 178 and the recesses 167 can be similar to a ski boot coupling to ski bindings. For instance, the protrusions 178 can extend inwardly such that the recesses 167 are configured to be received by or otherwise mated with the protrusions 178 and retained by the protrusions 178. The engagement between the protrusions 178 and the recesses 167 can also be described as an interference fit. Other coupling techniques such as bonding, welding, adhesive, fasteners, pins, and any other suitable technique are contemplated within the scope of this disclosure. Alternatively, the body 171 and the retention member 102 may be formed together.

The insertion path 173 may extend the length of the cavity 172. A first end wall 176 may include a vertical notch 180 that is in communication with the insertion path 173. The notch 180 may include an angled wall that may allow and guide a portion of the elongated body 195 to be disposed within the insertion path 173. A second end wall 175 of the body 171 may include a horizontal notch 179 sized to receive a portion of the elongated body 195. The horizontal notch 179 may be at least about 30, about 40, about 50, about 60, about 70, about 80 or about 90 degrees from the vertical notch 180. The notch 179 may allow the elongated body 195 to be aligned with a central axis of the body 171 when the secondary manipulator device 100 is in the secured state. The insertion path 173 may communicate with the opening 112 of the retention member 102. For example, in the illustrated embodiment, the handle 170 defines the insertion path 173 along which the elongated medical instrument 190 can be introduced into the channel 110, as discussed further below. That is, the elongated medical instrument 190 can be advanced along the insertion path 173, through the opening 112, and into the channel 110.

Figure 6A:
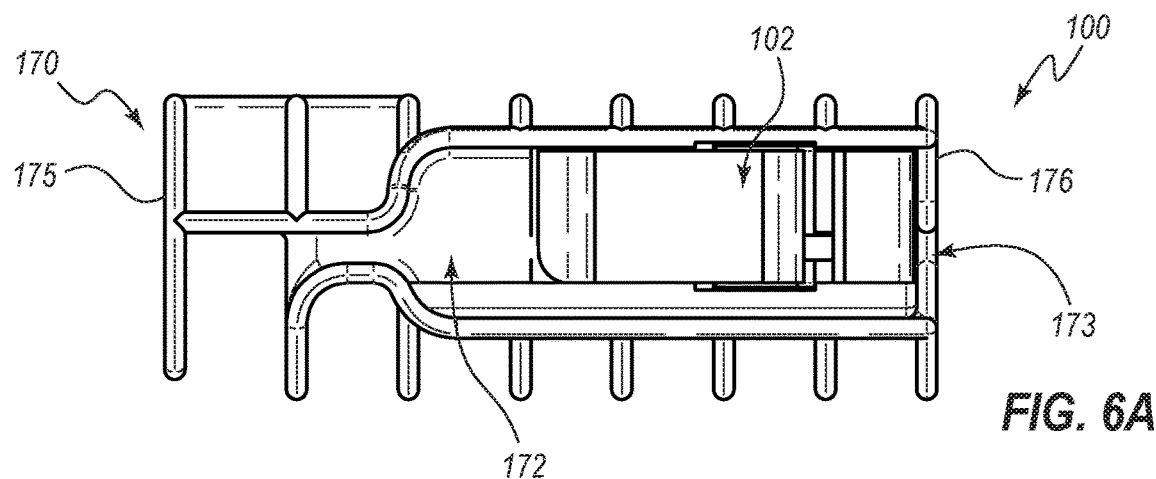
FIG. 6A is a top view of the secondary manipulator device of FIG. 1 with the retention member in the open state.

FIG. 6A is a top view of the secondary manipulator device 100 with the retention member 102 in the open state. The insertion path 173 of the handle 170 is shown extending along the length of the cavity 172 from the first end wall 175 to the second end wall 176.

Figure 6B:
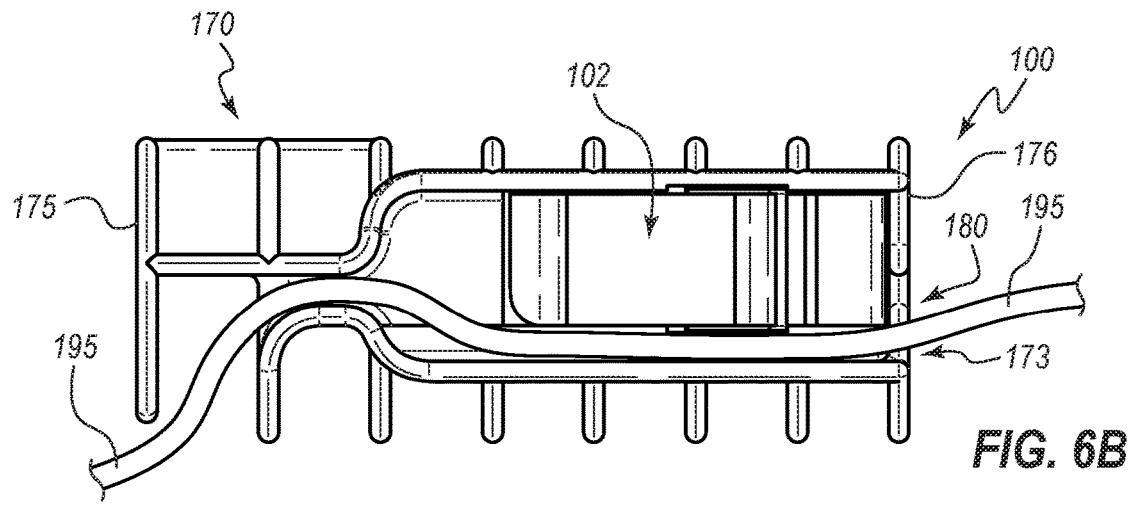
FIG. 6B is a top view of the secondary manipulator device of FIG. 1 with the retention member in the open state and with an intermediate portion of an elongated body of the elongated medical instrument disposed in an insertion path.

FIG. 6B is another top view of the secondary manipulator device 100 with the retention member 102 in the open state and of the elongated body 195 disposed within the insertion path 173 and the notch 180.

Figure 6C:
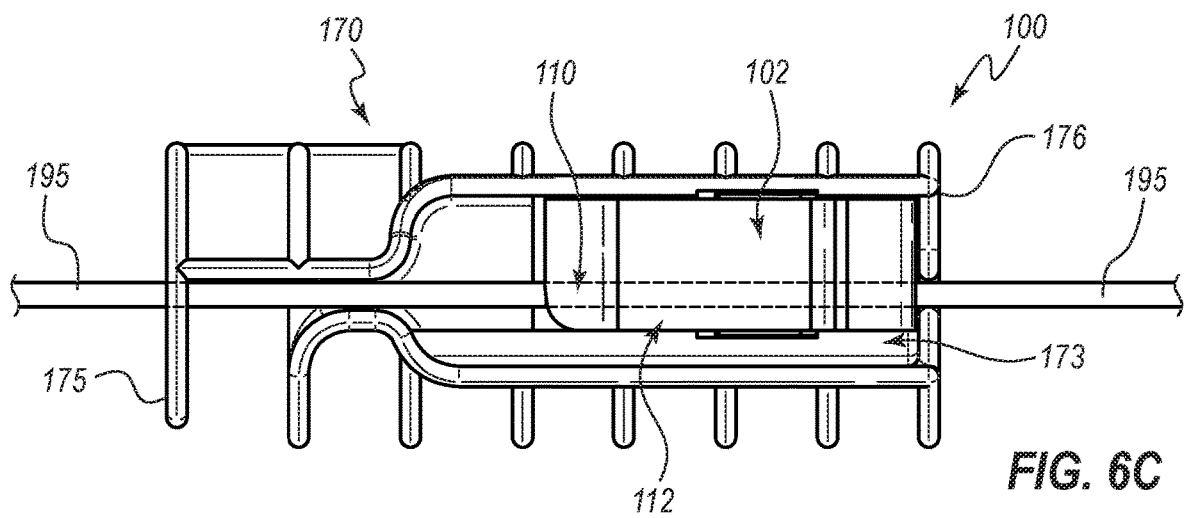
FIG. 6C is a top view of the secondary manipulator device of FIG. 1 with the retention member in the securing state and with the intermediate portion of the elongated body of the medical instrument disposed in a channel.

FIG. 6C is another top view of the secondary manipulator device 100 in the secured state after a portion of the elongated body 195 has been moved from the insertion path 173 through the opening 112 into the channel 110. The elongated body 195 may have a natural free state that is substantially linear. When the elongated body 195 is physically manipulated into the channel 110 by bending and turning within the insertion path 173 and then released, the elongated body 195 is substantially constrained in at least two locations along the length of the handle 170. For instance, the retention member 102 can engage and substantially constrain (or limit movement) of the elongated body 195 at a first location, and the handle 170 can substantially constrain (or limit movement) of the elongated body 195 at a second direction. More specifically, the second end wall 175 of the handle 170 can limit movement of the elongated body 195 in at least three directions (e.g., up, down, or inward) as a result of the configuration of the horizontal notch 179. The secondary manipulator device 100 can also become fixedly secured to the catheter body and any rotation or translation of the secondary manipulator device 100 will cause the elongated body 195 to move accordingly. When the device is in an open state or a closed state, the elongated member is constrained in the channel by the natural state form of the elongated member and the device can be repositioned along the elongated member longitudinal axis.

Figure 7:
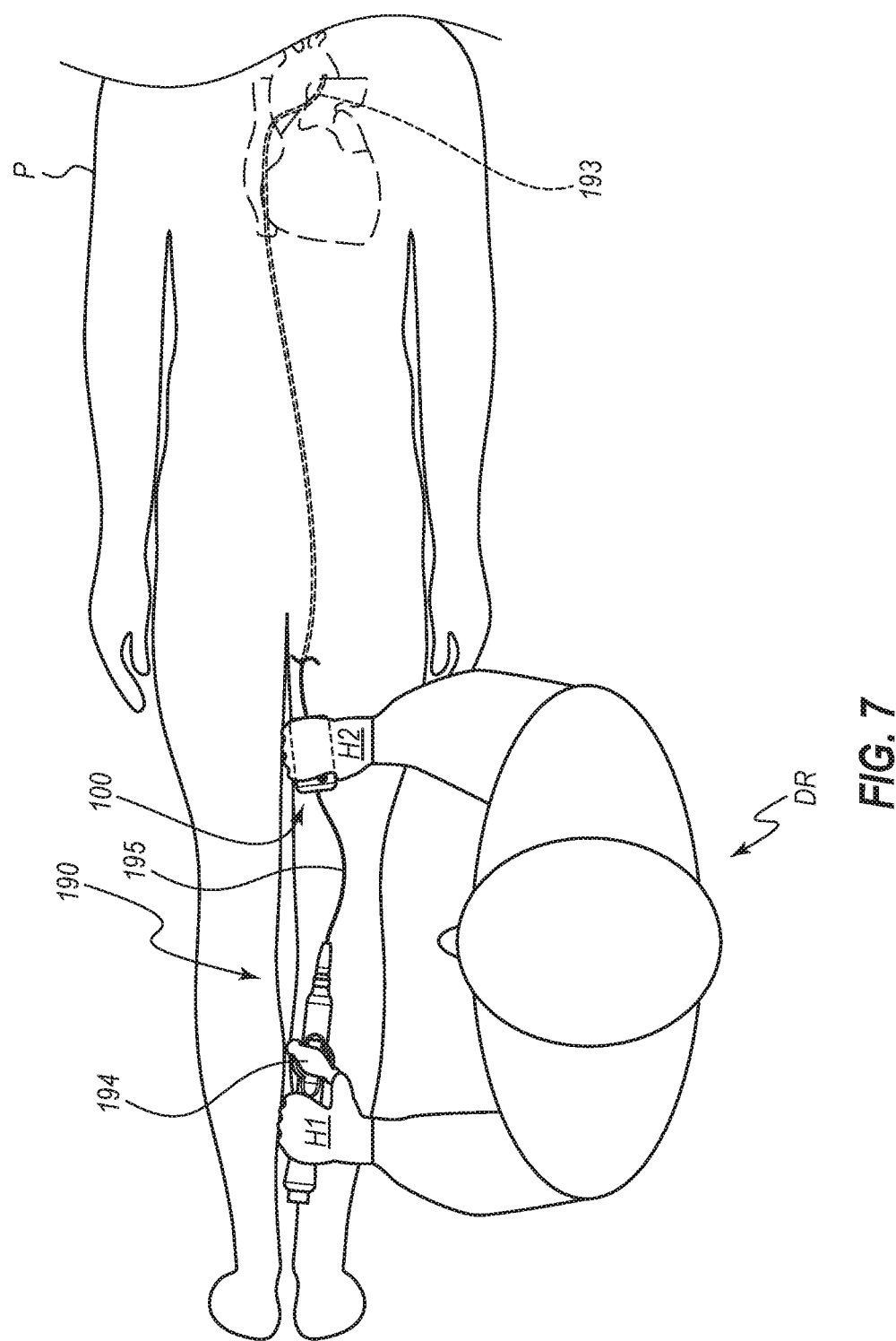
FIG. 7 is a top view of an operator manipulating the elongated medical instrument using the secondary manipulator device of FIG. 1 and a primary manipulator device.

FIG. 7 is a top view schematic of the elongated medical instrument 190, wherein a physician, doctor, healthcare worker, user, or operator DR is shown manipulating the elongated medical instrument 190 by a first hand H1 controlling the primary manipulator device 194 and a second hand H2 controlling the orientation and position of the secondary manipulator device 100 following securement of the secondary manipulator device 100 to the elongated body 195. Slack in the elongated body 195 disposed between the primary and secondary manipulator devices 194, 100 allows the operator DR to move the second hand H2 relative to the first hand H1 to cause the distal portion 193 to axially translate. Also, the operator DR can twist or rotate the second hand H2 about the longitudinal axis of the elongated body 195 relative to the first hand H1 and cause the distal portion 193 to rotate while the distal portion 193 is in a shaped configuration caused by the primary manipulator device 194 being controlled by the first hand H1 of the operator DR. This configuration of using the primary and secondary manipulator devices 194, 100 in conjunction with each other allows the operator DR to position the distal portion 193 at a desired location within the patient's body P for therapeutic or diagnostic purposes. For example, the distal portion 193 can be positioned in a coronary artery or cavity, including the heart atrium or ventricle, by utilizing the primary manipulator device 194 to shape the distal portion 193 and the secondary manipulator device 100 to axially translate and rotate the distal portion 193 during insertion of the elongated medical instrument 190 into the coronary artery. The location of the distal portion 193 can also be controlled for procedures like cardiac ablation and/or cardiac mapping.

Figure 8:
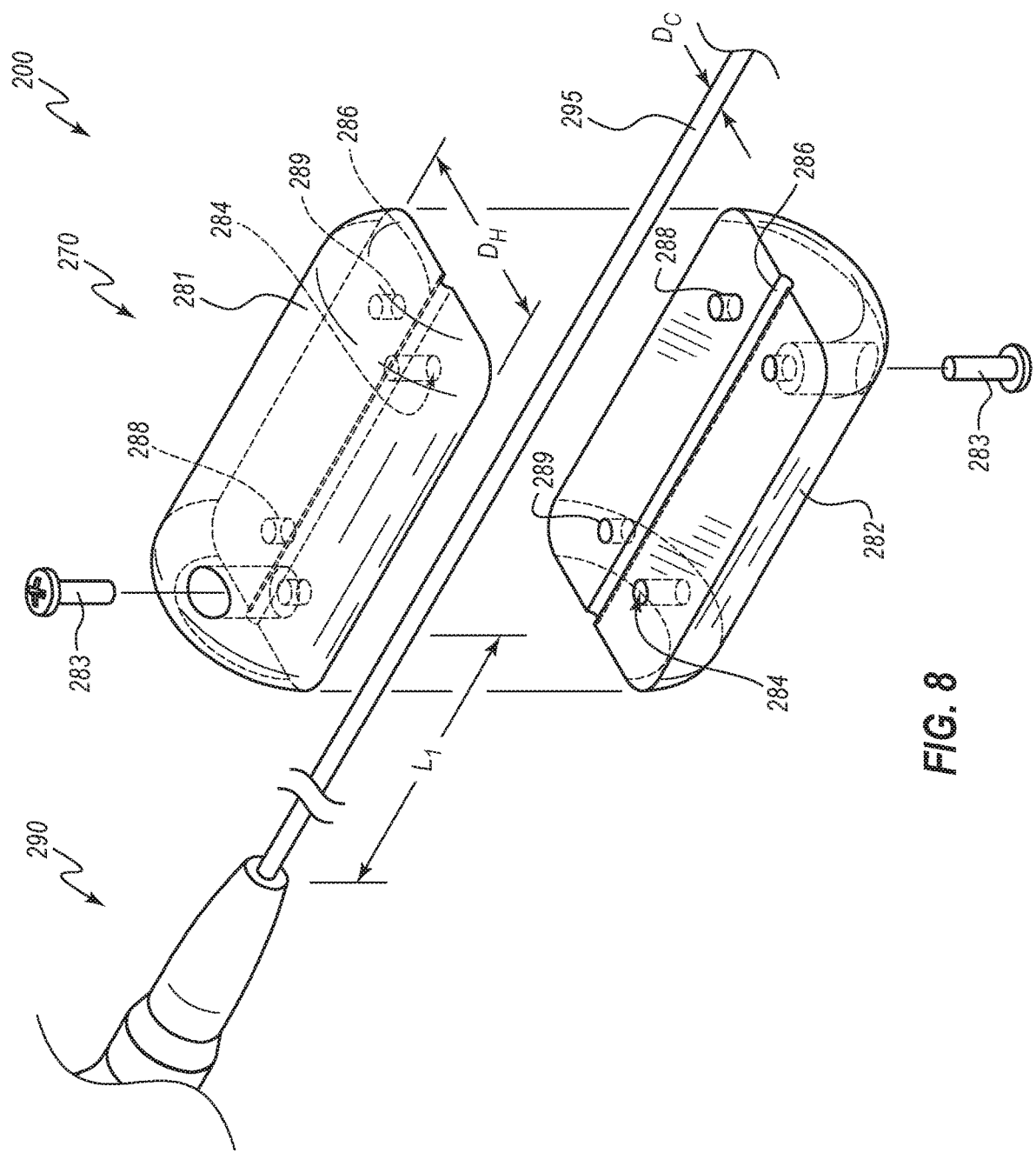
FIG. 8 is a perspective unassembled view of another embodiment of a secondary manipulator device.

FIG. 8 depicts an embodiment of a secondary manipulator device 200 according to another embodiment. The secondary manipulator device 200 resembles the secondary manipulator device 100 described above in certain respects. Accordingly, like features are designated with like reference numerals, with the leading digit incremented to "2." For example, the embodiment depicted in FIG. 8 includes a handle 270 that may, in some respects, resemble the handle 170 of FIG. 1. Relevant disclosure set forth above regarding similarly identified features thus may not be repeated hereafter. Moreover, specific features of the handle 170 and related components shown in FIGS. 1-7 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the secondary manipulator device 200 and related components depicted in FIG. 8. Any suitable combination of the features, and variations of the same, described with respect to the secondary manipulator device 100 and related components illustrated in FIGS. 1-7 can be employed with the secondary manipulator device 200 and related components of FIG. 8, and vice versa. This pattern of disclosure applies equally to further embodiments depicted in subsequent figures and described hereafter, wherein the leading digits may be further incremented.

FIG. 8 is an exploded perspective view of another embodiment of a secondary manipulator device 200 disassembled from an elongated body 295 of an elongated medical instrument 290. The secondary manipulator device 200 includes a handle 270. A diameter of the handle $D_H$ is at least twice a diameter of the elongated body 295 in some embodiments. In other embodiments, the handle diameter $D_H$ is 3, 5, 10, or 20 times the diameter the elongated body 295.

The handle 270 includes handle mating halves 281, 282 that can be substantially identical or complementary to one another. The handle mating halves 281, 282 include semi-circular channels 286 extending axially along a length of the handle 270. The channels 286 can form a circular channel when the handle mating halves 281, 282 are clamped together. A diameter of the circular channel can be smaller than the diameter of the elongated body 295 such that the elongated body 295 is fixedly secured within the handle 270 to facilitate manipulation of the elongated body 295. In some embodiments, the channels 286 may include a high-friction surface to increase the securement of the elongated body 295. For example, the high-friction surface may include one or more of ridges, grooves, bumps, recesses, high-frictional coatings, high-frictional material inserts, attachments, overmoldings of rubber, silicone, or thermoplastic elastomer, and/or any other suitable feature.

The handle 270 may include alignment pins 288 configured to be received into alignment holes 289 when the handle mating halves 281, 282 are coupled together. The alignment pins 288 and alignment holes 289 allow the channels 286 to align and form the circular channel around the elongated body 295. The handle 270 may include at least one fastener 283 configured to be threaded into at least one threaded hole 284 to facilitate clamping of the handle mating halves 281, 282 together about the elongated body 295. The handle 270 may be clamped together either before or after the elongated medical instrument 290 is inserted into the patient's body.

Figure 9:
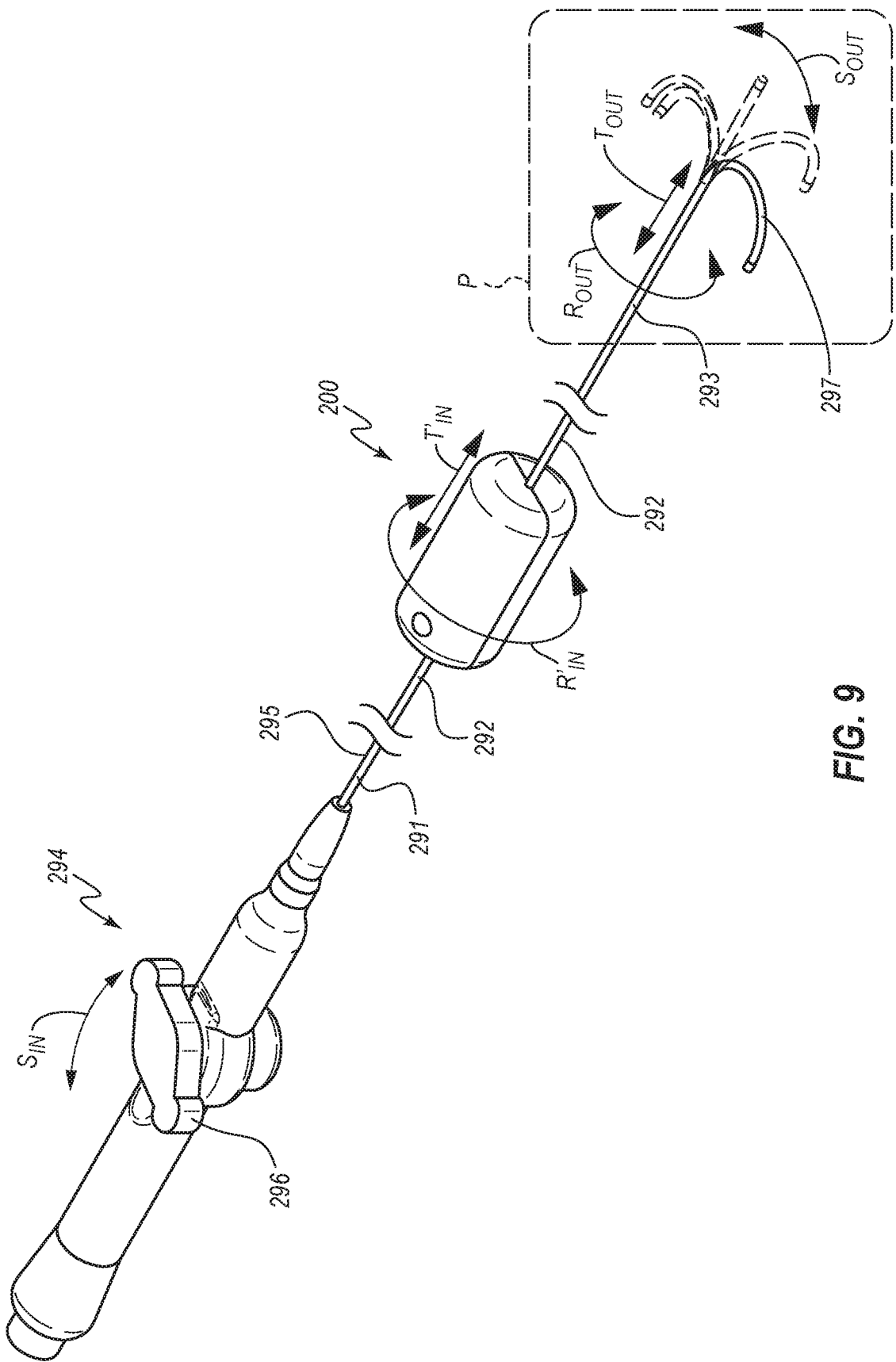
FIG. 9 is a perspective view of an embodiment of the secondary manipulator device of FIG. 8 coupled to an elongated medical instrument.

FIG. 9 depicts the secondary manipulator device 200 selectively coupled to an intermediate portion 292 of the elongated body 295. A primary manipulator device 294 is coupled to a proximal portion 291 of the elongated body 295 and is configured to control the shape of the distal portion 293 of the elongated body 295. For example, the primary manipulator device 294 may include an actuator 296 that can be actuated (e.g., rotated), shown as $S_{IN}$, to deform the shape of the distal end 297, shown as $S_{OUT}$. In certain embodiments, the actuator 296 can be actuated to bend or otherwise turn the distal end 297 of the elongated body 295. At the user's discretion, the secondary manipulator 200 can be manipulated to further control the distal portion 293 of the elongated body 295. For instance, the secondary manipulator 200 can be manipulated to control a rotation and/or axial translation of the distal end 297, which may be disposed inside a patient.

With continued reference to FIG. 9, the secondary manipulator device 200 can be axially translated, shown as $T'_{IN}$, relative to the primary manipulator device 294. Axial translation of the secondary manipulator device 200 ($T'_{IN}$) can result in axial translation of the distal portion 293 of the elongated body 295, shown as Tour. The secondary manipulator 200 can also be rotated, shown as $R'_{IN}$, about a longitudinal axis of the elongated body 295. Rotation of the secondary manipulator device 200 ($R'_{IN}$) can result in rotation of the distal portion 293 of the elongated body 295, shown as $R_{OUT}$.

Figure 10:
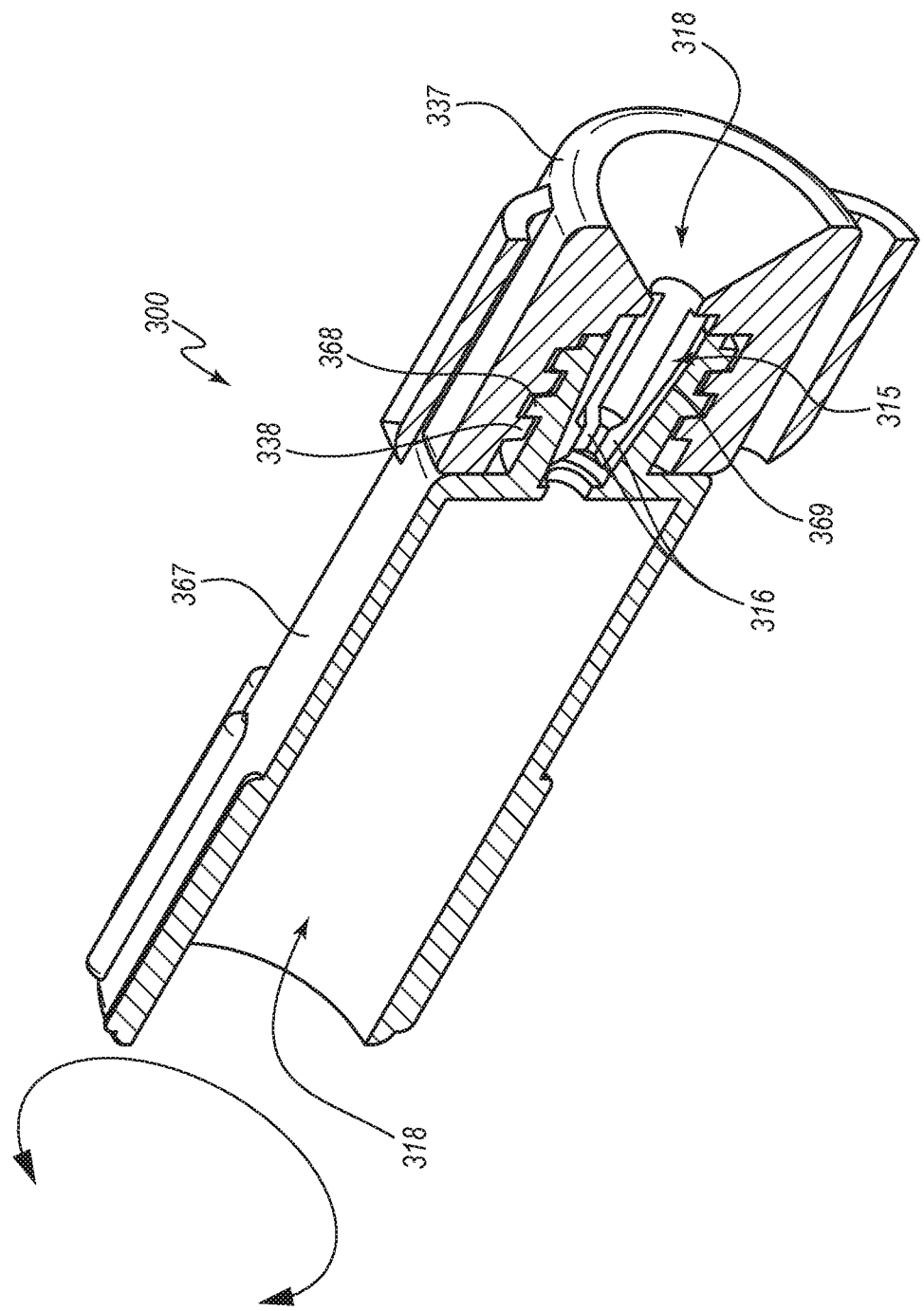
FIG. 10 is a perspective cross-sectional view of another embodiment of a secondary manipulator device.

FIG. 10 is a perspective cross-sectional view of another secondary manipulator device 300. As depicted, the secondary manipulator device 300 includes a knob handle 367 having an external thread 368 and a conical receiving portion 369 disposed at one end. A gripper handle 337 is coupled to an end of the knob handle 367. The gripper handle 337 includes an internal thread 338 configured to threading engage with the external thread portion 368. A ferrule 315 with fingers 316 is disposed within the conical receiving portion 369. A channel 318 extends through the knob handle 367 and the gripper handle 337. When the knob handle 367 is rotated one direction, the threads 338, 368 interact and cause the fingers 316 to engage with the conical receiving portion 369 and deflect inwardly. The fingers 316 can engage an elongated body (not shown) positioned through the channel 318. When the knob handle 367 is rotated an opposite direction, the fingers 316 retract radially away from the channel 318 and the elongated body.

Figure 11:
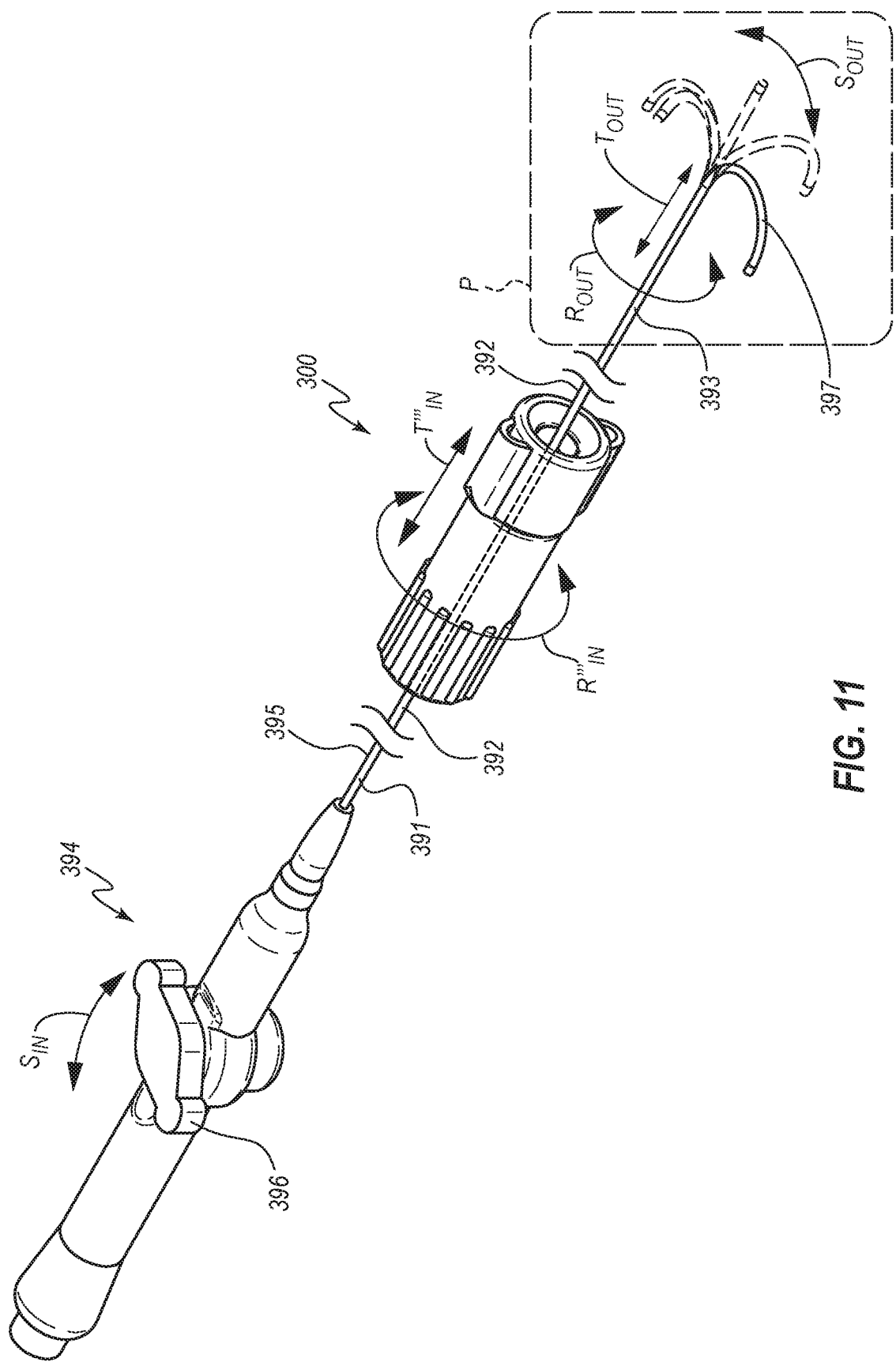
FIG. 11 is a perspective view of an embodiment of the secondary manipulator device of FIG. 10 coupled to an elongated medical instrument.

FIG. 11 depicts the secondary manipulator device 300 selectively coupled to an intermediate portion 392 of the elongated body 395. A primary manipulator device 394 is coupled to a proximal portion 391 of the elongated body 395 and is configured to control the shape of the distal portion 393 of the elongated body 395. For example, the primary manipulator device 394 may include an actuator 396 that can be actuated (e.g., rotated), shown as $S_{IN}$, to deform the shape of the distal end 397, shown as $S_{OUT}$. In certain embodiments, the actuator 396 can be actuated to bend or otherwise turn the distal end 397 of the elongated body 395. At the user's discretion, the secondary manipulator 300 can be manipulated to further control the distal portion 393 of the elongated body 395. For instance, the secondary manipulator 300 can be manipulated to control a rotation and/or axial translation of the distal end 397, which may be disposed inside a patient.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

References to approximations are made throughout this specification, such as by use of the term "substantially." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. For example, where the term "substantially perpendicular" is recited with respect to a feature, it is understood that in further embodiments, the feature can have a precisely perpendicular configuration.

Similarly, in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

The invention claimed is:

1. An elongated medical instrument manipulating system, comprising:
   an elongated medical instrument comprising:
      an elongated body having a distal portion that terminates at a distal end, a proximal portion that terminates at a proximal end, and an intermediate portion between the proximal portion and the distal portion; and
   a primary manipulator device coupled to the proximal end of the elongated body of the elongated medical instrument;
      wherein the primary manipulator device is configured to control a shape of the distal portion of the elongated body of the elongated medical instrument; and
      wherein the primary manipulator device is configured to bend the distal portion of the elongated body of the elongated medical instrument to move the distal end; and
   a secondary manipulator device coupled to the intermediate portion of the elongated body of the elongated medical instrument, the secondary manipulator device comprising:
      a retention member, comprising:
         a channel configured to receive therein the intermediate portion:
         a lock comprising a seat against which the intermediate portion is disposed, and a resiliently deformable retention arm that is movable relative to the seat,
         wherein at least a portion of the channel is defined by the seat and the retention arm; and
      a handle, comprising:
         an insertion path in communication with the channel and configured to receive the intermediate portion; and
         a cavity disposed within a handle body, wherein the retention member is disposed within the cavity such that the handle body extends at least around a majority of the retention member;
      wherein the primary manipulator device and the secondary manipulator device are separate devices and are offset from each other with the proximal portion of the elongated body of the elongated medical instrument extending between the primary manipulator device and the secondary manipulator device;
      wherein the secondary manipulator device is configured to permit an operator to grasp and move the secondary manipulator device; and
   wherein the secondary manipulator device and the elongated body of the elongated medical instrument are configured such that axially rotating the secondary manipulator device also rotates the intermediate portion of the elongated body of the elongated medical instrument, relative to the primary manipulator device, to axially rotate the distal portion of the elongated body of elongated medical instrument.

2. The system of claim 1, wherein the lock is configured to be selectively transitioned between an open state and a securing state, the retention arm being closer to the seat when the lock is in the securing state, as compared with the open state.

3. The system of claim 1, wherein the insertion path is configured to permit the intermediate portion to enter the channel when the lock is in an open state without the distal portion passing through the channel.

4. The system of claim 1, wherein the lock, when in a securing state, is configured to retain the intermediate portion within the channel to allow rotation and axial translation of the elongated body relative to a hub coupled to the proximal end.

5. The system of claim 1, wherein the lock further comprises a latch coupled to the seat and configured to selectively interact with the locking arm, wherein the lock is transitionable to a securing state by actuation of the locking arm such that the latch retains the locking arm, and wherein the lock is transitionable to an open state by actuation of the latch such that the latch releases the locking arm.

6. The system of claim 1, wherein the secondary manipulator device is selectively coupled to the intermediate portion of the elongated body of the elongated medical instrument.

7. An elongated medical instrument manipulator device comprising:
   a retention member, comprising:
      a channel configured to receive therein an intermediate portion of an elongated body of an elongated medical instrument;
      a lock configured to be selectively transitioned between an open state and a securing state, wherein the lock, when in the securing state, is configured to retain the intermediate portion of the elongated body of the elongated medical instrument within the channel;
         wherein the lock comprises a seat and a resiliently deformable retention arm that is movable relative to the seat;
         wherein at least a portion of the channel is defined by the seat and the retention arm;
         wherein, when the lock is in the securing state, the intermediate portion of the elongated body of the elongated medical instrument is disposed between the seat and the resiliently deformable retention arm; and
   a handle, comprising;
      a handle body and a cavity disposed within the handle body; and
      an insertion path in communication with the cavity of the handle and the channel of the retention member, wherein the insertion path is configured to receive the intermediate portion of the elongated body of the elongated medical instrument without passing an end of the elongated medical instrument through the insertion path;
         wherein the retention member is disposed within the cavity of the handle and the handle body extends around the retention member;
         wherein the handle body has a shape and a length, wherein the shape and the length of the handle body permit an operator to grasp the handle body by curling fingers of a first hand of the operator into contact with the handle body while a thumb or finger of the first hand accesses the lock to transition the lock between the open state and the securing state; and
         wherein the shape and the length of the handle body permit the operator to grasp the handle body with the first hand and to rotate the handle such that, when the lock is in the securing state, rotation of the handle rotates the retention member, thereby rotating the intermediate portion of the elongated body of the elongated medical instrument.

8. The manipulator device of claim 7, wherein the lock further comprises a latch coupled to the seat and configured to selectively interact with a locking arm, wherein the lock is transitionable to the securing state by actuation of the locking arm such that the latch retains the locking arm, and wherein the lock is transitionable to an open state by actuation of the latch such that the latch releases the locking arm.

9. The manipulator device of claim 7, wherein the seat and the retention arm comprise a gripping surface comprising any one of ridges, grooves, bumps, recesses, high-frictional coatings, high-frictional material inserts, attachments, or overmoldings of rubber, silicone, or thermoplastic elastomer.

10. The manipulator device of claim 7, wherein the channel constrains the elongated body within the manipulator device in at least two locations along a length of the channel.

11. An elongated medical instrument manipulating system, comprising:
an elongated medical instrument comprising:
an elongated body having a distal portion that terminates at a distal end, a proximal portion that terminates at a proximal end, and an intermediate portion between the proximal portion and the distal portion;
a primary manipulator device coupled to the proximal end of the elongated body of the elongated medical instrument;
wherein the primary manipulator device is configured to control a shape of the distal portion of the elongated body of the elongated medical instrument;
wherein the primary manipulator device is configured to bend the distal portion of the elongated body of the elongated medical instrument to move the distal end; and
a secondary manipulator device coupled to the intermediate portion of the elongated body of the elongated medical instrument, the secondary manipulator device comprising:
a retention member, comprising:
a channel configured to receive therein the intermediate portion of the elongated body of the elongated medical instrument;
a lock configured to be selectively transitioned between an open state and a securing state, wherein the lock, when in the securing state, is configured to retain the intermediate portion of the elongated body of the elongated medical instrument within the channel such that the elongated body moves as the retention member moves;
a handle, wherein the handle has a handle body with a generally cylindrical shape to enable the handle body to be gripped and twisted such that, when the lock is in the securing state, the handle rotates the retention member to rotate the intermediate portion of the elongated body of the elongated medical instrument;
wherein the primary manipulator device and the secondary manipulator device are separate devices and are spaced apart from each other with the proximal portion of the elongated body of the elongated medical instrument extending between the primary manipulator device and the secondary manipulator device;
wherein the primary manipulator device and the secondary manipulator device are configured to permit an operator to grasp and move the secondary manipulator device with a first hand of the operator, while the operator controls the shape of the distal portion of the elongated medical instrument via the primary manipulator device with a second hand of the operator; and
wherein the elongated body, the primary manipulator device, and the secondary manipulator device are configured such that axially rotating the secondary manipulator device also rotates the intermediate portion of the elongated body of the elongated medical instrument, relative to the primary manipulator device, to axially rotate the distal portion of the elongated body of the elongated medical instrument.

12. The system of claim 11, wherein the elongated body is configured to permit slack between the primary manipulator device and the secondary manipulator device while the distal end is moved.

13. The system of claim 11, wherein the secondary manipulator device is selectively coupled to the intermediate portion of the elongated body of the elongated medical instrument.

14. The system of claim 11, wherein the handle body has a diameter that is at least twice a diameter of the elongated body.

15. The system of claim 11, wherein the handle is sized to be gripped between a user's thumb and fingers.

16. The system of claim 11, wherein the elongated body is substantially linear when the elongated body is in a natural free state.

17. The system of claim 11, wherein an operator may selectively transition the lock between the open state and the securing state via movement of a digit of the first hand of the operator while other digits of the first hand of the operator grasp the handle body of the secondary manipulator device.

* * * * *